United States Patent Office 2,875,235
Patented Feb. 24, 1959

2,875,235
PRODUCTION OF BICYCLO HETEROCYCLIC PHOSPHORAMIDES AND THIONOPHOSPHORAMIDES

William M. Lanham, Charleston, W. Va., assignor to Union Carbide Corporation, a corporation of New York No Drawing. Application November 26, 1956
Serial No. 624,196

13 Claims. (Cl. 260—461)

This invention relates to the production of a novel class of bicyclo heterocyclic phosphoramides and thioniphosphoramides; and more especially it concerns novel amides having structures represented by the formula

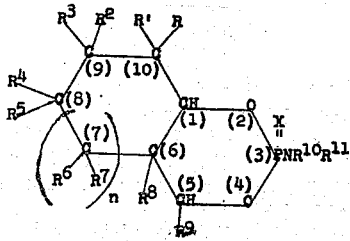

wherein R designates hydrogen; R' to R⁹, respectively, designate a member of the class consisting of hydrogen and the alkyl radicals having 1 to 20 carbon atoms, and preferably where R designates hydrogen, R', $R^2$, $R^3$, $R^5$, $R^6$, $R^7$ and $R^8$, respectively, represent hydrogen or a lower alkyl radical having 1 to 6 carbon atoms; $R^4$ and $R^9$, respectively, represent hydrogen or the alkyl radicals having 1 to 20 carbon atoms; X designates oxygen or sulfur; and $R^{10}$ and $R^{11}$, respectively, designate hydrogen, a lower alkyl radical, or a cyanoalkyl, chloroalkyl, phenyl, or benzyl radical, or $R^{10}$ and $R^{11}$ together designate a carbazolyl residue; and $n$ is 0 or 1.

Typical compounds of the invention are 2,4-dioxa-P-oxo-3-phosphabicyclo[4.3.0]nonanes, 2,4-dioxa-P-thiono-3-phosphabicyclo[4.3.0]nonanes, and the corresponding [4.4.0-]decanes, such compounds having directly connected with the P atom a monoalkylamino or dialkylamino group, such as the methylamino, ethylamino, diethylamino, butylamino, hexylamino and 2-ethylhexylamino groups; a cyanoalkylamino group, such as the 2-cyanoethylamino, di-(2-cyanoethylamino), 2-cyanopropylamino and the cyanobutylamino groups; a haloalkylamino group, such as 2-chloroethylamino, 2-bromoethylamino and 2-chloropropylamino groups; an arylamino group, such as the phenylamino, diphenylamino, benzylamino, and tolylamino groups; and the carbazolyl group.

Other typical compounds of the invention correspond to the foregoing, but wherein one or more of the carbon atoms in the cycloalkane ring is substituted by one or two lower alkyl groups, such as the ethyl, methyl and butyl groups.

The novel compounds of the invention are effective insecticides, those having lower alkylamino radicals directly connected to the phosphorous atom and those having a thiono group directly attached to the phosphorus atom, being particularly effective especially in the control of bean aphids, Mexican bean beetle larva and southern army worm larva. Thus, an aqueous solution containing 0.250 g. per 100 cc. of solution of the product of Example 1, sprayed upon plants infested with bean aphids, gave 95–100% control thereof in 24 hours. Similarly, the product of Example 2 is an effective insecticide for the control of bean aphids under the conditions indicated. The novel compounds also are useful plasticizers for resinous vinyl chloride-containing polymers, such as the polyvinyl chlorides, and the copolymers of vinyl chloride with vinyl acetate or with other vinyl esters of lower fatty acids. For example, the compounds of Examples 3, 7 and 9 are plasticizers for resinous copolymers of vinyl chloride and vinyl acetate containing 96% of the chloride, upon fluxing for 5 minutes at 158° C. on a differential 2-roll mill a composition consisting of 64.5% of the resin, 35% of the said compound, and 0.5% of a commercial heat stabilizer, all by weight. Similarly, the products of Examples 2, 4, 5 and 10 are useful plasticizers for polyvinyl chloride resins upon fluxing in the aforesaid manner a composition containing 64.5% of the resin, 35% of said compound, and 0.5% of a commercial heat stabilizer, all by weight. The amido, phenylamido, and the higher alkylamido compounds have special utility as plasticizers for these resins. The novel compounds are also flameproofing agents in such resin compositions; and are useful as petroleum additives.

The novel compounds of the invention can be prepared by various processes. One preferred process involves reacting (1) a heterocyclic bicyclo phosphorus chloride or bromide having the structure

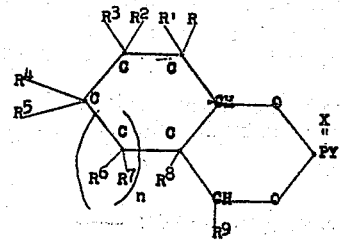

wherein R, R' to R⁹, X and $n$ have the meanings hereinbefore indicated; and Y designates chlorine or bromine; with (2) ammonia or a mono- or di- substituted amine of the type designated by $HNR^{10}R^{11}$ wherein $R^{10}$ and $R^{11}$ have the meanings hereinbefore designated, and (3) an alkali metal hydroxide such as sodium hydroxide, according to the general equation:

(1)
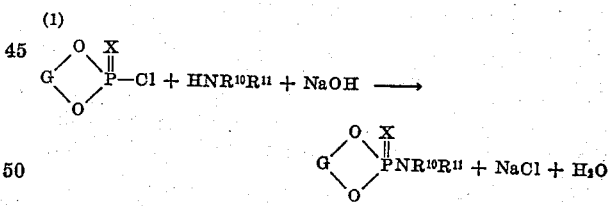

wherein G designates the hydrocarbon residue of a 2-(1-hydroxyalkyl)cyclopentanol or cyclohexanol. Preferably the phosphorus-containing reactant is added dropwise to an agitated suspension of the alkali metal hydroxide in a solution of the amine reactant in an inert solvent such as ethyl ether, benzene, toluene or pyridine. Reaction temperatures within the range from —20° C. to +125° C. are operative. However, during mixing of the reactants, temperatures below 30° C. are preferable to inhibit side reactions. The amine reactant can be used in stoichiometric quantities, but an excess of 150 mol percent or more thereof is not objectionable. Although one equivalent of the alkali metal hydroxide per mol of the phosphorus-containing reactant is useful, it is usually desirable to employ a 5 to 25 mol percent excess of the former. The alkali metal carbonates and bicarbonates can be substituted in the process for the corresponding hydroxide. The resultant product usually is readily isolated from the reaction mixture by washing with water to eliminate excess base, and subsequently stripping the washed reaction mixture by distillation under vacuum. It is not necessary that the alkali metal hydroxide, carbonate or bicarbonate be anhydrous.

The novel compounds of the invention also may be made by reacting the hereinbefore described heterocyclic bicyclo phosphorus chloride or bromide with a primary or secondary amine of the type herein described, in accordance with the general equation (2)
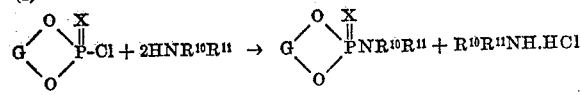

the usual procedure being to add the amine, in a 25 to 200 mol percent excess above the stoichiometric quantity, to an agitated solution of the phosphorus-containing reactant in an inert solvent such as chloroform, ethyl ether, or toluene, at a reaction temperature of around 0 to 10° C. Temperatures within the range from −20° C. to 125° C. are operative in the process. After the reaction is completed, the excess amine is removed in suitable manner, as by pot distillation or by conversion thereof to a hydrochloride by treatment with hydrogen chloride followed by filtration. The product then can be purified by washing with water, drying over calcium sulfate, filtering, and stripping by distillation under vacuum. For instance, where the product is appreciably water-soluble, the product can be extracted with water (as illustrated in Example 6) or it can be extracted from the amine hydrochloride, as in Example 4, and the washing step omitted.

Another method for the production of these novel compounds is illustrated by the following equation:

(3)
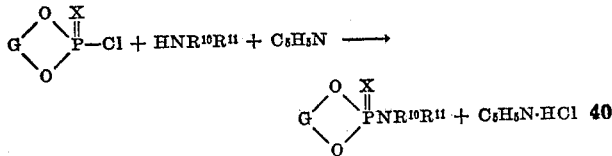

In this procedure, the phosphorus-containing reactant can be added to a solution of the two amines in an inert solvent, or the tertiary amine can be mixed with the phosphorus-containing reactant in an inert solvent and the other amine then added. Other tertiary amines such as triethylamine and dimethylaniline can be substituted for the pyridine. The amounts of the two amine reactants employed are not critical provided that at least one mole of each is employed per mol of the phosphorus-containing reactant. The temperatures and methods of isolating the products are the same as those used in the previously described processes.

Among amines useful as starting materials in the process may be mentioned methylamine, dimethylamine, ethylamine, isopropylamine, dibutylamine, hexylamine, 2-ethylhexylamine, dioctylamine, heptadecylamine, 2-cyanoethylamine, cyanobutylamine, di-(2-cyanoethyl)amine, 2-chloroethylamine, 2-bromoethylamine, di-(2-chloroethyl)amine, 2-chloropropylamine, phenylamine, diphenylamine, benzylamine, dibenzylamine, tolylamine and carbazole.

The heterocyclic bicyclo phosphorus chlorides and bromides used as starting materials can be prepared by reacting a phosphoryl halide or a thiophosphoryl halide with a cycloalkane-1,3-diol, such as the 2-(1-hydroxyalkyl)-cyclohexanols and corresponding cyclopentanols, and the corresponding 2-(1-hydroxyalkyl)cycloalkanols substituted on at least one carbon atom of the cycloalkanol ring with at least one alkyl radical having 1 to 20 carbon atoms. The prosphoryl halide can be added slowly to an agitated suspension or solution of the diol in an inert solvent for the product, such as benzene, maintained at around −20° C. to +60° C., preferably under around 500 mm. of mercury pressure, and using equimolar proportions of the reactants. In making the thiono-halide starting materials the cycloalkanediol can be added dropwise to equimolar amounts of the thiophosphonyl halide in benzene containing the theoretical two mols of a tertiary amine such as pyridine for each mol of the diol, the reaction being conducted at a temperature in the range from 25° C. to around 60° C. The reaction mixture is washed with water, and the washed residue is distilled under high vacuum for further purification, if desired.

A process for making the heterocyclic bicyclo phosphorus chlorides and bromides used as starting materials is described in my pending U. S. patent application, Serial No. 539,030, filed October 6, 1955, and involves reacting a phosphoryl halide or a thiophosphoryl halide with a di-secondary cycloalkane-1,3-diol having a structure corresponding to the formula

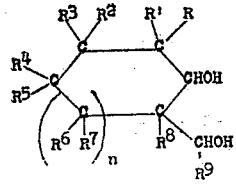

wherein R, R' to $R^9$ and $n$ have the meanings hereinbefore recited. Methods for making these cycloalkane-1,3-diols are described in Compt. rend., 207, 429–430; Comt. rend. 207, 475–477 (1938); and Chem. Abstracts, 33, 148 (1939). Still another method is described in U. S. Patent No. 2,356,683.

Among cycloalkanediols useful in making the starting materials for this invention may be mentioned:

2-hydroxymethylcyclohexanol
2-hydroxymethylcyclopentanol
2-(1-hydroxyethyl)cyclopentanol
2-(1-hydroxyethyl)-3-methylcyclopentanol
2-(1-hydroxypropyl)cyclopentanol
2(1-hydroxypropyl)cyclohexanol
2-(1-hydroxyisobutyl)cyclohexanol
2-(1-hydroxyoctadecyl)cyclohexanol
2-(1-hydroxyethyl)3,5,5-trimethylcyclohexanol
2-(1-hydroxyethyl)-3,3,5-trimethylcyclohexanol
2-(1-hydroxypropyl)-3,5,5-trimethylcyclohexanol
2-(1-hydroxypropyl)-3,3,5-trimethylcyclohexanol
2-(1-hydroxyisobutyl)3,5,5-trimethylcyclohexanol
2-(1-hydroxyisobutyl)3,3,5-trimethylcyclohexanol
2-(1-hydroxyoctadecyl)-3,5,5-trimethylcyclohexanol
2-(1-hydroxyoctadecyl)-3,3,5-trimethylcyclohexanol
2-(1-hydroxyethyl)-6-methylcyclohexanol
2-(1-hydroxyethyl)-2-methylcyclohexanol
2-(1-hydroxypropyl)-5-methylcyclohexanol
2-(1-hydroxypropyl)-3-methylcyclohexanol
2-(1-hydroxyisobutyl)-4-methylcyclohexanol
3,6-dimethyl-2-(1-hydroxyoctadecyl)cyclohexanol
2,5-dimethyl-2-(1-hydroxyoctadecyl)cyclohexanol
2-(1-hydroxyethyl)-4-tert-butylcyclohexanol The following examples serve to illustrate the invention:

Example I

During 15 minutes, 0.3 mol of P-chloro-2,4-dioxa-5-methyl - P - thiono-3-phosphabicyclo[4.4.0]decane were added to an agitated suspension of 0.325 mol of powdered sodium hydroxide in 150 g. of ethyl ether and 0.76 mol of dimethylamine held at 10° C.–15° C. After standing overnight at 25° C., it was filtered, the filtrate washed with 500 cc. of water, dried over calcium sulfate, again filtered, and the filtrate stripped by distillation to a kettle temperature of 50° C. under less than 2 mm. of mercury. The resultant P-dimethylamido-2,4-dioxa-5-methyl-P-thiono-3-phosphabicyclo-[4.4.0]decane was secured as a colorless fluid liquid still residue having the following properties: $n\ 30/D=1.5230$; acidity$=0.008$ cc. of normal KOH/g.; percent yield (based upon the phosphorus-filtered, and the filtrate stripped by distillation to a kettle temperature of 50° C. under less than 2 mm. of mercury pressure. There was thus secured as a yellow fluid residue a 59% yield of P-dimethylamido-2,4-dioxa-5-methyl-P-oxo-3-phosphabicyclo-[4.4.0]decane having the following properties: $n\ 30/D = 1.4808$; acidity=0.008 cc. of normal KOH/g.; it analyzed as follows, in percent by weight: P=13.10; N=5.52; C=52.39; H=8.61.

This compound is an effective plasticizer for resinous copolymers of vinyl chloride and vinyl acetate containing around 96% of the chloride in the polymer.

Example 8

Gaseous methylamine (0.74 mol) was diffused during 45 minutes into a refluxing solution (kettle temperatureture=38° C.) of 0.29 mol of the phosphorus-containing reactant of Example 1 in 0.3 mol of pyridine and 150 cc. of ethyl ether. After standing 20 hours at 25° C. the reaction mixture was filtered, the filtrate washed with 250 cc. of water, dried over calcium sulfate, filtered and the filtrate was stripped by distillation at 98° C. under less than 2 mm. of mercury pressure. The resultant 2,4 - dioxa - 5 - methyl - P - methylamido - P - thiono - 3-phosphabicyclo[4.4.0]decane was secured in 71% yield as a brown pasty residue having an acidity of 0.05 cc. of normal KOH/g., and the following analysis, in percent by weight: P=13.00; S=13.20; N=6.46; C=46.24; H=7.72.

Example 9

During 10 minutes a solution of 0.3 mol of the phosphorus-containing reactant of Example 3 and 25 g. of benzene were added to an agitated solution of 0.6 mol of 2-amino-2-methylpropionitrile, 0.3 mol of pyridine and 200 g. of benzene held at 25° C.–30° C. After standing overnight at 25° C. the reaction mixture was filtered and, after standing at 25° C. for 5 days, again filtered. The latter filtrate was washed with concentrated aqueous sodium bicarbonate and then with 750 cc. of distilled water, and the washed filtrate was stripped by distillation to a kettle temperature of 100° C. under less than 2 mm. of mercury pressure. There was thus obtained an 87% yield of P - (2 - cyano - 2 - propylamido) - 2,4 - dioxa - 5-methyl-P-oxo-3-phosphabicyclo[4.4.0]decane as a viscous brown residue having the following properties: acidity=0.06 cc. of normal KOH/g.; $n\ 30/D=1.4850$; and the following analysis, in percent by weight: P=10.77; N=8.02; C=53.02; H=7.69.

Example 10

To an agitated solution consisting of 0.5 mol of aniline, 0.5 mol of pyridine and 300 cc. of benzene held at 10° C.–15° C. there were added dropwise during 10 minutes a solution of 0.5 mol of the phosphorus-containing reactant of Example 3 and 50 cc. of benzene. After further agitation at 25° C. for 4.5 hours and standing overnight, the reaction mixture was filtered; and the filtrate was washed with a 20% aqueous solution of sodium hydroxide and then washed with 600 cc. of water. The washed filtrate was then stripped by distillation at 100° C. under less than 2 mm. of mercury. The residue was dissolved in 400 cc. of benzene, held overnight at 25° C. and filtered. The filtrate was washed with aqueous sodium bicarbonate solution and with water, filtered and the filtrate stripped by distillation at 95° C. under less than 2 mm. of mercury, yielding 73 g. of 2,4-dioxa-5-methyl - P - oxo - P - phenylamido - 3 - phosphabicyclo [4.4.0]decane in the form of a brown solid residue having a melting point of 89° C.; an acidity equivalent to 0.03 cc. of normal KOH/g.; and the following analysis, in percent by weight: P=10.97; N=4.27; C=58.29; H=6.98.

The invention is susceptible of modification within the scope of the appended claims.

I claim:

1. As new compounds, bicyclo heterocyclic phosphoramides and thionophosphoramides having structures designated by the formula:

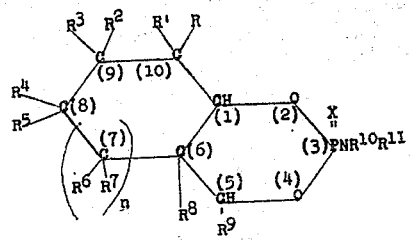

wherein R designates hydrogen; R', $R^2$, $R^3$, $R^5$, $R^6$, $R^7$ and $R^8$, respectively, designate a member of the class consisting of hydrogen and the lower alkyl radicals; $R^4$ and $R^9$, respectively, is of the class consisting of hydrogen and the alkyl radicals having 1 to 20 carbon atoms; X represents a radical of the class consisting of oxygen and sulfur; $R^{10}$ and $R^{11}$, respectively, designates a member of the class consisting of hydrogen, the alkyl radicals having 1 to 17 carbon atoms and the cyano- lower alkyl, phenyl and tolyl radicals, and $R^{10}$ and $R^{11}$, together designate a carbazolyl residue; and $n$ is an integer of the class consisting of 0 and 1.

2. As new compounds, bicyclo heterocyclic phosphoramides and thionophosphoramides having structures designated by the formula:

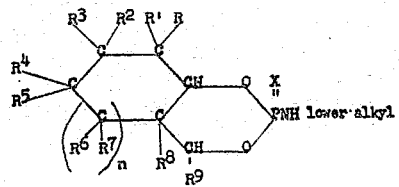

wherein R designates hydrogen; R', $R^2$, $R^3$, $R^5$, $R^6$, $R^7$ and $R^8$, respectively, designates a member of the class consisting of hydrogen and the lower alkyl radicals; $R^4$ and $R^9$, respectively, are of the class consisting of hydrogen and the alkyl radicals having 1 to 20 carbon atoms; X represents a radical of the class consisting of oxygen and sulfur; and $n$ is an integer of the class consisting of 0 and 1.

3. P - butylamido - 2,4 - dioxa - 5 - methyl - P - oxo-3-phosphabicyclo(4.4.0)decane.

4. As new compounds, bicyclo heterocyclic phosphoramides and thionophosphoramides having structures designated by the formula:

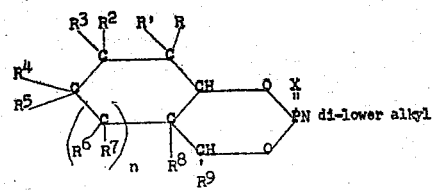

wherein R designates hydrogen; R', $R^2$, $R^3$, $R^5$, $R^6$, $R^7$, and $R^8$, respectively, designates a member of the class consisting of hydrogen and the lower alkyl radicals; $R^4$ and $R^9$, respectively, are of the class consisting of hydrogen and the alkyl radicals having 1 to 20 carbon atoms; X represents a radical of the class consisting of oxygen and sulfur; and $n$ is an integer of the class consisting of 0 and 1.

5. As new compounds, bicyclo heterocyclic phosphoramides and thionophosphoramides having structures designated by the formula:

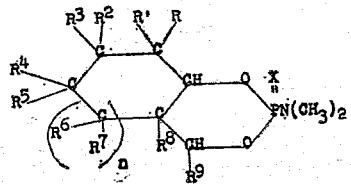

containing reactant)=79. It analyzed as follows, in percent by weight: P=12.78 (theory=12.42); S=12.25 (theory=12.85); N=5.63 (theory=5.62); C=47.82 (theory=48.17); H=7.75 (theory=8.08); Cl=0.05 theory=nil).

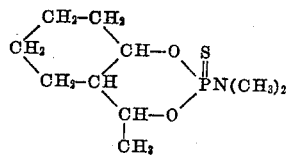

*Example 2*

0.3 mol of P-chloro-5,7-dimethyl-2,4-dioxa-P-thiono-3-phosphabicyclo[4.3.0]nonane were added dropwise during 15 minutes to an agitated suspension of 0.325 mol of powdered sodium hydroxide in a solution of 1.11 mols of dimethylamine and 150 g. of ethyl ether maintained at 10° C.–15° C. After standing overnight at 25° C., the reaction mixture was filtered, and the filtrate was stripped of excess amine by distillation at 25° C. under 10 mm. of mercury pressure. The distillation residue was diluted with 150 cc. of ethyl ether, washed with 250 cc. of water, dried, filtered, and the filtrate was stripped by distillation to a kettle temperature of 50° C. under less than 2 mm. of mercury. The resultant 5,7-dimethyl-P-dimethylamido-2,4-dioxa-P-thiono-3-phosphabicyclo[4.3.0]nonane was secured in 71% yield as a clear yellow liquid residue having an acidity of 0.009 cc. of normal KOH/g.; n 30/D=1.5128; and the following analysis, in percent by weight: P=12.30 (theory=12.42); S=12.89 (theory=12.85); N=5.83 (theory=5.62); C=48.52 (theory=48.17); H=8.23 (theory=8.08)

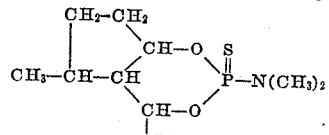

*Example 3*

During 15 minutes 0.2 mol of P-chloro-2,4-dioxa-5-methyl-P-oxo-3-phosphabicyclo[4.4.0]decane were added dropwise to an agitated suspension of 0.25 mol of powdered sodium hydroxide in a solution of 0.2 mol of carbazole and 200 g. of pyridine maintained at 10° C.–15° C. After standing at 25° C. for 48 hours, the reaction mixture was diluted with ethyl ether, washed with 150 cc. of water, and stripped by distillation at 100° C. under less than 2 mm. of mercury pressure. The residue was dissolved in 200 cc. of toluene, cooled to −20° C. and filtered to remove 17 grams of unreacted carbazole in solid form. The filtrate was weathered, diluted with ethyl ether and stripped by distillation at 25° C. under less than 2 mm. of mercury pressure, yielding 2,4-dioxa-P-diphenyleneimido-5-methyl-P-oxo-3-phosphabicyclo[4.4.0]decane as a gummy residue product having an acidity=0.04 cc. of normal KOH/g. and the following analysis in percent by weight: P=8.57 (theory=8.72); N=3.41 (theory=3.94); C=65.51 (theory=67.60); H=6.84 (theory=6.24).

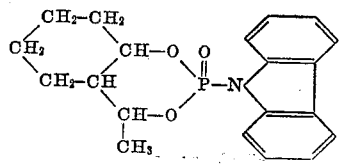

*Example 4*

P-amido-2,4-dioxa-5-methyl-P-oxo-3-phosphabicyclo[4.4.0]decane was prepared in good yield by diffusing 1.29 mols of gaseous ammonia into 0.5 mol of P-chloro-2,4-dioxa-5-methyl-P-oxo-3-phosphabicyclo[4.4.0]decane in 500 cc. of chloroform held at 10° C.–15° C. The reaction mixture then was filtered at 25° C., and the filtrate was diluted with 2,000 cc. of ethyl ether, again filtered, and the resultant filtrate stripped by distillation at 25° C. under less than 5 mm. of mercury pressure. The solid still residue was dissolved in 1,000 cc. of xylene at 140° C., filtered hot, and the filtrate cooled to 20° C. and again filtered. The residue from the last filtration was washed with ethyl ether and air dried, providing a good yield of the desired product in the form of a white solid having a melting point of 153° C.–155° C.; an acidity of 0.03 cc. of normal KOH/g. and the following analysis: P=14.99; N=7.13; C=47.22; H=7.30; Cl=nil.

*Example 5*

To an agitated solution of 0.6 mol of n-butylamine in 300 g. of benzene held at 10° C.–15° C. there were added during 20 minutes dropwise a solution of 0.3 mol of P-chloro-2,4-dioxa-5-methyl-P-oxo-3-phosphabicyclo[4.4.0]decane and 25 g. of benzene. After holding the reaction mixture at 25° C. for around 100 hours and at 70° C. for 6 hours, a total of 24 g. of pyridine were added, followed by heating at 70° C. for 7 hours, and standing for 5 days at 25° C. The reaction mixture was washed with 100 cc. of concentrated aqueous sodium bicarbonate, followed by 300 cc. of water, dried over calcium sulfate, filtered, and the filtrate stripped by distillation to a kettle temperature of 150° C. under less than 2 mm. of mercury pressure, thereby yielding as a still residue an 81% yield of P-butylamido-2,4-dioxa-5-methyl-P-oxo-3-phosphabicyclo[4.4.0]decane in the form of a clear brown viscous liquid having the following properties: n 30/D=1.4810; acidity=0.03 cc. of normal KOH/g.; and the following analysis, in percent by weight: P=11.58; N=5.27; C=54.98; H=8.71; Cl=nil.

*Example 6*

Gaseous dimethylamine (1.46 mols) were diffused during 25 minutes into an agitated solution of 0.5 mol of P-chloro-2,4-dioxa-5-methyl-P-oxo-3-phosphabicyclo[4.3.0]nonane in 300 cc. of ethyl ether maintained at 0.° C. to 10° C. After standing at 25° C. overnight the reaction mixture was filtered, and the filtrate washed with 600 cc. of water, dried, filtered, and the filtrate stripped by distillation at 50° C. under less than 2 mm. of mercury pressure. The solution resulting from the washing of the filtrate with water was extracted with benzene, and the benzene extracts were dried over calcium sulfate, filtered, and the filtrate stripped by distillation at 50° C. under less than 2 mm. of mercury pressure. The resultant distillation residue was combined with that of the first-named distillation, providing a good yield of P-dimethylamido-2,4-dioxa-5-methyl-P-oxo-3-phosphabicyclo[4.3.0]nonane as a white mushy solid residue having an acidity of 0.007 cc. of normal KOH/g.; and the following analysis, in percent by weight: P=14.04; N=6.37; C=48.87; H=8.40.

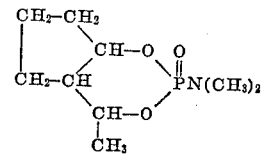

*Example 7*

1 mol of gaseous dimethylamine was diffused during 20 minutes into a solution of 0.3 mol of P-chloro-2,4-dioxa-5-methyl-P-oxo-3-phosphabicyclo[4.4.0]decane in 250 cc. of ethyl ether held at 0° C. to 10° C. The reaction mixture was filtered, and the filtrate was stripped by distillation at 25° C. under less than 5 mm. of mercury. The still residue was diluted with 200 cc. of ethyl ether and 75 cc. of benzene, washed with 225 cc. of water until neutral to litmus, dried over calcium sulfate, wherein R designates hydrogen; $R'$, $R^2$, $R^3$, $R^5$, $R^6$, $R^7$ and $R^8$, respectively, designates a member of the class consisting of hydrogen and the lower alkyl radicals; $R^4$ and $R^9$, respectively, are of the class consisting of hydrogen and the alkyl radicals having 1 to 20 carbon atoms; X represents a radical of the class consisting of oxygen and sulfur; and $n$ is an integer of the class consisting of 0 and 1.

6. P - dimethylamido - 2,4 - dioxa - 5 - methyl - P-oxo-3-phosphabicyclo(4.4.0)decane.

7. As new compounds, bicyclo heterocyclic phosphoramides and thionophosphoramides having structures designated by the formula:

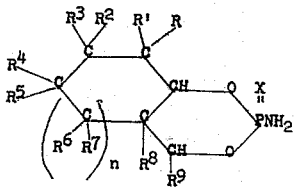

wherein R designates hydrogen; $R'$, $R^2$, $R^3$, $R^5$, $R^6$, $R^7$, and $R^8$, respectively, designates a member of the class consisting of hydrogen and the lower alkyl radicals; $R^4$ and $R^9$, respectively, are of the class consisting of hydrogen and the alkyl radicals having 1 to 20 carbon atoms; X represents a radical of the class consisting of oxygen and sulfur; and $n$ is an integer of the class consisting of 0 and 1.

8. P - amido - 2,4 - dioxa - 5 - methyl - P - oxo - 3-phosphabicyclo(4.4.0)decane.

9. As new compounds, bicyclo heterocyclic phosphoramides and thionophosphoramides having structures designated by the formula:

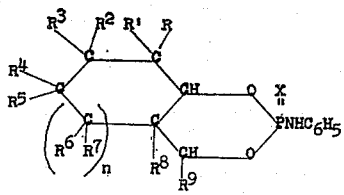

wherein R designates hydrogen; $R'$, $R^2$, $R^3$, $R^5$, $R^6$, $R^7$, and $R^8$, respectively, designates a member of the class consisting of hydrogen and the lower alkyl radicals; $R^4$ and $R^9$, respectively, are of the class consisting of hydrogen and the alkyl radicals having 1 to 20 carbon atoms; X represents a radical of the class consisting of oxygen and sulfur; and $n$ is an integer of the class consisting of 0 and 1.

10. As new compounds, bicyclo heterocyclic thionophosphoramides having structures designated by the formula:

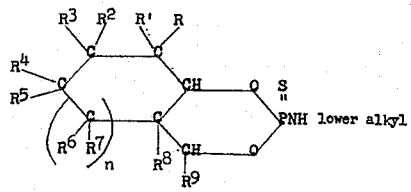

wherein R designates hydrogen; $R'$, $R^2$, $R^3$, $R^5$, $R^6$, $R^7$ and $R^8$, respectively, designates a member of the class consisting of hydrogen and the lower alkyl radicals; $R^4$ and $R^9$, respectively, are of the class consisting of hydrogen and the alkyl radicals having 1 to 20 carbon atoms; and $n$ is an integer of the class consisting of 0 and 1.

11. 2,4 - dioxa - 5 - methyl - P - methylamido - P-thiono-3-phosphabicyclo(4.4.0)decane.

12. As new compounds, bicyclo heterocyclic thionophosphoramides having structures designated by the formula:

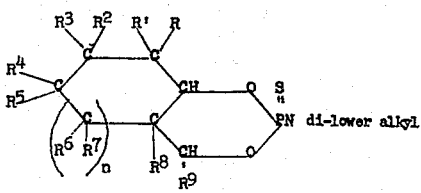

wherein R designates hydrogen; $R'$, $R^2$, $R^3$, $R^5$, $R^6$, $R^7$ and $R^8$, respectively, designates a member of the class consisting of hydrogen and the lower alkyl radicals; $R^4$ and $R^9$, respectively, are of the class consisting of hydrogen and the alkyl radicals having 1 to 20 carbon atoms; and $n$ is an integer of the class consisting of 0 and 1.

13. P - dimethylamido - 2,4 - dioxa - 5 - methyl - P-thiono-3-phosphabicyclo(4.4.0)decane.

No references cited.